(12) United States Patent
DeLine et al.

(10) Patent No.: US 8,453,106 B2
(45) Date of Patent: May 28, 2013

(54) GRAPHICAL USER INTERFACE FOR EXPLORING SOURCE CODE EXECUTION BEHAVIOR

(75) Inventors: Robert Anthony DeLine, Seattle, WA (US); Jonathan de Halleux, Seattle, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 12/970,983

(22) Filed: Dec. 17, 2010

(65) Prior Publication Data
US 2012/0159452 A1 Jun. 21, 2012

(51) Int. Cl.
*G06F 9/44* (2006.01)

(52) U.S. Cl.
USPC ........... 717/104; 717/105; 717/111; 717/124; 717/125; 717/134

(58) Field of Classification Search
None
See application file for complete search history.

(56) References Cited

U.S. PATENT DOCUMENTS

| 6,748,583 | B2* | 6/2004 | Aizenbud-Reshef et al. | 717/127 |
| 2007/0168992 | A1 | 7/2007 | Bates | |
| 2009/0265692 | A1 | 10/2009 | Godefroid et al. | |
| 2010/0083233 | A1 | 4/2010 | Vanoverberghe et al. | |

OTHER PUBLICATIONS

Hähnle, et al., "A Visual Interactive Debugger Based on Symbolic Execution", Retrieved at << http://www.cse.chalmers.se/~reiner/papers/ase.pdf >>, 25th IEEE/ACM International Conference on Automated Software Engineering, Sep. 20-24, 2010, pp. 1-4.

Wang, et al., "EVOLVE: An Open Extensible Software Visualization Framework", Retrieved at << http://citeseerx.ist.psu.edu/viewdoc/download?doi=10.1.1.5.2863&rep=rep1&type=pdf >>, Sable Technical Report No. 2002-122003, Dec. 19, 2002, pp. 1-18.

Deline, et al., "Software Development with Code Maps", Retrieved at << http://delivery.acm.org/10.1145/1840000/1831329/p10-deline.pdf?key1=1831329&key2=2404565821&coll=GUIDE& dl=GUIDE&CFID=106375280&CFTOKEN=59462128 >>, Queue-Visualization, vol. 8, No. 7, Jul. 2010, pp. 1-9.

Roychoudhury, et al., "Darwin: An Approach for Debugging Evolving Programs", Retrieved at << http://research.microsoft.com/pubs/80326/darwin.pdf >>, Technical Report, MSR-TR-2008-91, Dec. 2008, pp. 1-27.

Zamfir, et al., "Execution synthesis: A technique for automated software debugging", Retrieved at <<http://kisvm2.epfl.ch/record/146733/files/esd.pdf >>, Fifth EuroSys Conference, Apr. 13-16, 2010, pp. 1-14.

Cross, et al., "Scalable visualizations to support reverse engineering: a framework for evaluation", Retrieved at << http://ieeexplore.ieee.org/stamp/stamp.jsp?tp=&arnumber=723190 >>, Proceedings Fifth Working Conference on Reverse Engineering, Oct. 12-14, 1998, pp. 201-209.

DeLine, "Making CHASE Mainstream", Retrieved at << http://research.microsoft.com/apps/pubs/default.aspx?id=81050>>, Keynote at Making CHASE Mainstream, ICSE 2009, pp. 1-16.

* cited by examiner

*Primary Examiner* — Don Wong
*Assistant Examiner* — Deric Ortiz (57) ABSTRACT

Described herein are interactive graphical user interfaces that visualize execution behavior of source code together with theoretical execution behavior of the source code together with the source code itself. Structure of the source code is analyzed to determine theoretical execution behavior of the source code. Thereafter, symbolic execution of the source code is undertaken to output an execution trace. The execution trace is shown together with the theoretical execution behavior of the source code.

20 Claims, 7 Drawing Sheets

GRAPHICAL USER INTERFACE FOR EXPLORING SOURCE CODE EXECUTION BEHAVIOR

BACKGROUND

Source code generated by developers during the course of a software project can often be quite lengthy and complex. For instance, source code pertaining to an operating system can include hundreds of thousands to millions of lines of code. During the software development process, developers will generate source code, test the source code for bugs, fix such bugs with the use of a debugger, etc. It is well known that oftentimes complex software will include many different branches, such that depending upon values of variables in the source code different branches may be taken during execution of the software.

Accordingly, software developers frequently have questions about software projects upon which they are working. Among some of the most difficult and time consuming of these questions are related to actual execution behavior of the software. For instance, a developer may wonder if a particular line of code is ever executed and, if it is executed, what branches were taken to reach such line of code. Oftentimes, during execution of a particular piece of software values are assigned to variables that were unintended or unexpected by the developer.

Conventionally, to monitor software execution behavior, developers typically have conversations with their colleagues or co-developers, manually inspect log data pertaining to software execution, or attempt to use a break point debugger to drive the execution of the software to a particular line of code. As mentioned above, however, many current software projects include a significant number of lines of code, and thus answering any of the questions described above can be an error prone, time consuming, and frustrating process for the developer.

SUMMARY

The following is a brief summary of subject matter that is described in greater detail herein. This summary is not intended to be limiting as to the scope of the claims.

Described herein are various technologies pertaining to visualizing execution behavior of source code and interactively depicting possible executions of source code to a developer are described herein. Pursuant to an example, a developer can select source code, wherein this source code may be or include a method, a function, etc. The selected source code includes a plurality of branches, wherein different branches of the source code may be executed depending upon values of variables in such source code. Thus, the source code can also include a plurality of statements, wherein the plurality of statements are utilized to define values for variables. Exemplary branch points that may be included in source code include conditionals (if and switch conditionals), loops (for each, while do/while), jumps (return, break, continue), exception throws, exception handling, amongst other branch points.

The structure of the source code can be analyzed to ascertain theoretical execution behaviors of the source code. These theoretical execution behaviors can include traversals each branch in the source code. These theoretical execution behaviors can be graphically presented to the user on a graphical user interface as a control flow diagram in correlation with the source code. For instance, a control flow diagram can graphically represent the theoretical execution behaviors as a continuous line with branches that correspond to branches in the source code. Additionally, the control flow diagram can include a plurality of graphical indicia such as circles, squares, etc. that visually correlate with statements in the source code.

The user may then interact with the graphical user interface to indicate a desired start point and end point of execution of the source code for testing purposes. For example, the user can select a particular method as a start point and can select the end of that method as the end point. Subsequent to the user indicating that the desired start an end points in the source code, an execution engine can utilize symbolic execution techniques to perform a symbolic execution of the source code between the selected start point and end point. Based at least in part upon this symbolic execution of the source code, one or more execution traces can be output, wherein the execution traces are representative of actual execution behavior of a source code (and not theoretical execution behavior of the source code). At least one of these execution traces can be graphically presented to the user on the graphical user interface together with the source code and the control flow diagram. In an example, the execution trace can be displayed as an overlay of the control flow diagram such that the developer can quickly ascertain the branches taken during execution of the source code represented by the execution trace.

If the developer wishes to ascertain how the source code may reach a particular line of code, the developer can select a statement corresponding to that line of code represented on the control flow diagram and can constrain the symbolic execution of the source code to ensure that the source code is executed through the line of code that is of interest to the developer. Again, through symbolic execution of the source code, one or more execution traces can be output and, if desired by the developer, graphically presented to the developer together with the source code and the control flow diagram. The developer may then select particular graphical indicia on the display execution trace to review values of variables that cause the execution of the program to reach the statement of interest.

Other aspects will be appreciated upon reading and understanding the attached figures and description.

DETAILED DESCRIPTION

Various technologies pertaining to visualizing software execution behavior will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
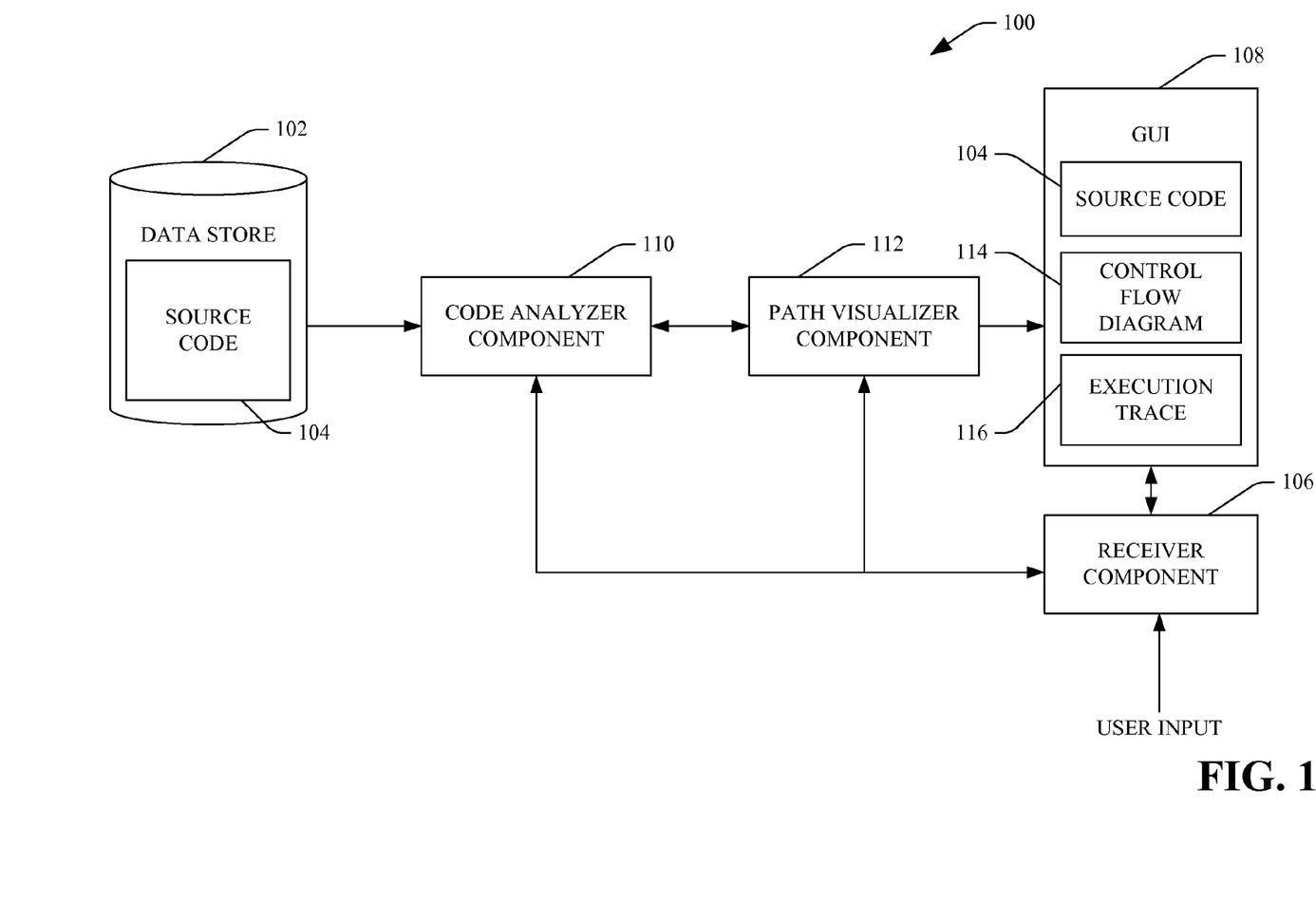
FIG. 1 is a functional block diagram of an exemplary system that facilitates visually depicting software execution behavior on a graphical user interface to a developer.

With reference to FIG. 1, an exemplary system 100 that facilitates visualizing execution behavior of source code is illustrated. The system 100 comprises a data store 102 that includes source code 104. The source code 104 may be written in any suitable language including C, C#, Java, etc. The source code 104 includes a plurality of statements that define values for variables utilized in the source code 104. Additionally the source code 104 comprises a plurality of branches, wherein execution of the source code may be over one or more of the branches. Branches in the source code 104 are taken during execution of the source code 104 based at least in part upon values of the variables corresponding to the statements. Values for variables can be based upon user inputs, function calls to related source code, etc.

The system 100 further comprises a receiver component 106 that receives a selection of the source code 104 from a user (developer). For instance, the user can access the source code 104 by way of a graphical user interface 108 that facilitates interactive analysis of execution behavior of the source code 104. Pursuant to an example, the user can select the source code 104 by way of one or more drop down menus available in the graphical user interface 108.

A code analyzer component 110 is in communication with the receiver component 106 and can analyze the structure of the source code 104. Through this structural analysis, the code analyzer component 110 can ascertain theoretical execution behavior of the source code 104. In an example, the code analyzer component 110 can ascertain all possible execution flows in the source code 104 based at least in part upon the structure of the source code 104. The various control flows that can be ascertained by the code analyzer component 110 can include flows pertaining to branch points in the source code 104 such as conditionals (if or switch statements), loops (for, for each, while do/while), jumps (returns, breaks, continues) exception flows, exception handling, etc. A path visualizer component 112 can update the graphical user interface 108 for presentment to the user. More specifically, the path visualizer component 112 can cause theoretical execution flows output by the code analyzer component 110 to be displayed in the graphical user interface 108 as a control flow diagram 114. Alternatively, the path visualizer component 112 can cause text of source code encompassed by a theoretical execution flow to be highlighted, rather than visualizing the theoretical execution flow as a control flow diagram. Highlighting is intended to encompass changing color of text, altering background color behind text to visually distinguish a possible execution flow of source code, etc. Text can be colored to visually indicate branch points in source code, for instance. In another exemplary embodiment, text can be positioned to graphically depict possible execution behavior of source code based upon an analysis of the source code 104 by the code analyzer component 110. Thus, it is to be understood that any suitable mechanism for visually depicting possible execution paths of the source code 104 is contemplated and intended to fall under the scope of the hereto-appended claims.

Additionally, in an example, the path visualizer component 112 can cause the source code 104 to be presented in the graphical user interface 108 in correlation with the control flow diagram 114, such that the user can quickly ascertain visually the different execution paths that are theoretically possible when the source code 104 is executed. Further, for instance, and as will be shown below, the control flow diagram 114 can be depicted as a continuous line with numerous branches that is shown in graphical correlation with the source code 104. The control flow diagram 114 can also include a plurality of graphical indicia thereon that visually correspond to statements in the source code 104.

Once a user has been presented with a visual depiction of possible execution flows of the source code (104) (e.g., as a control flow diagram or through some other visualization) in the graphical user interface 108, the user, for instance, can interact with the visual depiction in connection with causing an execution trace to be generated. In an example, the user can select two points from the control flow diagram 114: a desired beginning point and a desired end point for purposes of testing the source code 104. Additionally or alternatively, rather than requiring the user to select an end point, the user can simply select a method that is desirably tested, wherein the end point is inferred to be the completion of such method. Subsequent to the user selecting at least the aforementioned beginning point in the control flow diagram 114, the user can provide input by way of the receiver component 106 to indicate a desire to have one or more execution traces generated pertaining to the source code 104. The code analyzer component 110, responsive to the user input, can utilize symbolic execution to output at least one execution trace pertaining to the source code 104 (wherein the execution trace is from the beginning point selected by the user and completes at the end point selected by the user). As one of ordinary skill in the art can ascertain, symbolic execution refers to the analysis of programs by tracking symbolic values retained in the source code 104. Typically, symbolic execution is utilized to reason about all inputs that take a substantially similar execution path through a program. The at least one execution trace can be provided to the path visualizer component 112, which can cause an execution trace 116 to be graphically presented in the graphical user interface 108 together with the source code 104 and the visual depiction of possible execution flows of the source code 104 (e.g., the control flow diagram 114). For instance, in a first example, the execution trace can be overlaid on top of the control flow diagram 114 such that the user can visually ascertain which of several possible paths in the source code 104 was taken. Furthermore, the control flow diagram 114 can be presented in the graphical user interface 108 in a first color while the execution trace 116 is presented in the graphical user interface 108 in a second color, thereby enabling the user to quickly differentiate between the control flow diagram 114 and the execution trace 116. In another example, an execution trace can be displayed by highlighting (e.g., bolding, italicizing, . . . ) statements that are executed during the execution trace. In yet another example, an execution trace can be displayed by indenting text of the source code 104 in some manner to visually depict to the user an execution path that was taken through the source code 104.

In many cases, utilization of symbolic execution by the code analyzer component 110 will result in the code analyzer component 110 outputting multiple execution traces over the source code 104 since many different paths in the source code 104 may be taken during execution of such source code 104. Pursuant to an example, these multiple execution traces can be output and presented to the user in the graphical user interface 108 in list form. Thereafter, the user can choose to select one or more of the execution traces, wherein all selected execution traces can be displayed on the graphical user interface 108 together with, for instance, the control flow diagram 114 and the source code 104.

Each execution trace, for example, can be visualized by the path visualizer component 112 in different manners (e.g., different colors) and placed beside one another such that the user can visually ascertain differences between the execution traces output by the code analyzer component 110. Based at least in part upon the information presented in the graphical user interface 108, the user can ascertain, for instance, which paths/branches are taken during an execution trace to reach a particular statement in the source code 104. Accordingly, rather than needing to run a debugger line by line through the source code 104 in an attempt to drive execution of the source code 104 to a particular statement, the user can view the graphical user interface 108 and ascertain execution traces that run through a statement of interest and may, for instance, select a particular execution trace to obtain more information about the path taken to reach a statement of interest. For instance, the user can select a particular statement in the graphical user interface 108 and details pertaining to such statement can be graphically depicted to the user.

As mentioned previously, the control flow diagram 114 may include graphical indicia that corresponds to statements in the source code 104. These graphical indicia can also be shown together or be included in visualizations of the execution trace 116. Accordingly, to obtain more information about a particular statement in the source code 104, the user can interact with the graphical user interface 108 by selecting an appropriate graphical indicia that corresponds to a statement in the source code 104 as shown in the graphical user interface 108.

The above description has related to the user providing the code analyzer component 110 with an open ended task of locating execution traces corresponding to the source code 104 without providing any constraints on such execution traces. In many cases, however, the user may wish to provide certain constraints with respect to the symbolic execution of the source code 104 undertaken by the code analyzer component 110. In an example, the user may be particularly interested in a certain statement in the source code 104. The user can review the graphical user interface 108 and the control flow diagram 114 shown therein and can select a graphical indicia in the control flow diagram 114 that corresponds to the statement of interest. The user may then indicate that she is interested in graphically reviewing an execution trace that passes through that particular statement. The code analyzer component 110 is then restricted to outputting execution traces that flow through the statement that is of interest to the user.

Further, the user can select multiple statements (by selecting multiple graphical indicia in the control flow diagram) and can restrict the code analyzer component 110 to output execution traces that pass through the selected statements. The user may then select the execution trace that passes through those statements to obtain more information as to what value variables are assigned in the source code 104 to drive execution of the source code 104 through the statement selected by the user. Additionally, the user can specify particular numerical constraints with respect to one or more statements selected in the graphical user interface 108 (the user selects statements by selecting the corresponding graphical indicia in the control flow diagram 114). When the user selects a particular statement, the user can provide a value or range of values that corresponding to a statement, and this value or range of values for that statement can be provided to the code analyzer component 110. Thereafter, the code analyzer component 110 can perform the symbolic execution on the source code 104 with the constraints of the value or range of values assigned to a particular variable by the user.

Other constraints that can be set forth by the user are also contemplated. For instance, the user may wish to be provided with a shortest execution trace over a particular portion of code, and can constrain the code analyzer component 110 to outputting such shortest execution trace. In another example, the user may wish to constrain provision of execution traces based upon content of the execution traces—thus, for instance, the user may only wish to be provided execution traces that include or do not include loops, certain conditional statements, etc. Still further, the user may wish to constrain output execution traces based at least in part upon which thread is executing a trace. Again, other constraints are contemplated and are intended to fall under the scope of the hereto-appended claims.

The code analyzer component 110 can subsequently output at least one execution trace (if any execution traces pass through the statement with a particular value assigned to a variable) and the path visualizer component 112 can cause the execution trace 116 to be visualized in the graphical user interface 108 together with the source code 104 and the control flow diagram. In this manner, the user can visually ascertain how execution of the source code 104 occurs with the constraints provided by the user. Again, the user can provide numerous constraints with respect to a plurality of variables in the source code 104 and can restrict the symbolic execution undertaken by the code analyzer component 110 with respect to the source code 104 based in part on the constraints. Therefore, any execution traces output by the code analyzer component 110 accord to be constrained in accordance with user-provided constraints, and the path visualizer component 112 can graphically depict such execution traces on the graphical user interface 108.

Figure 2:
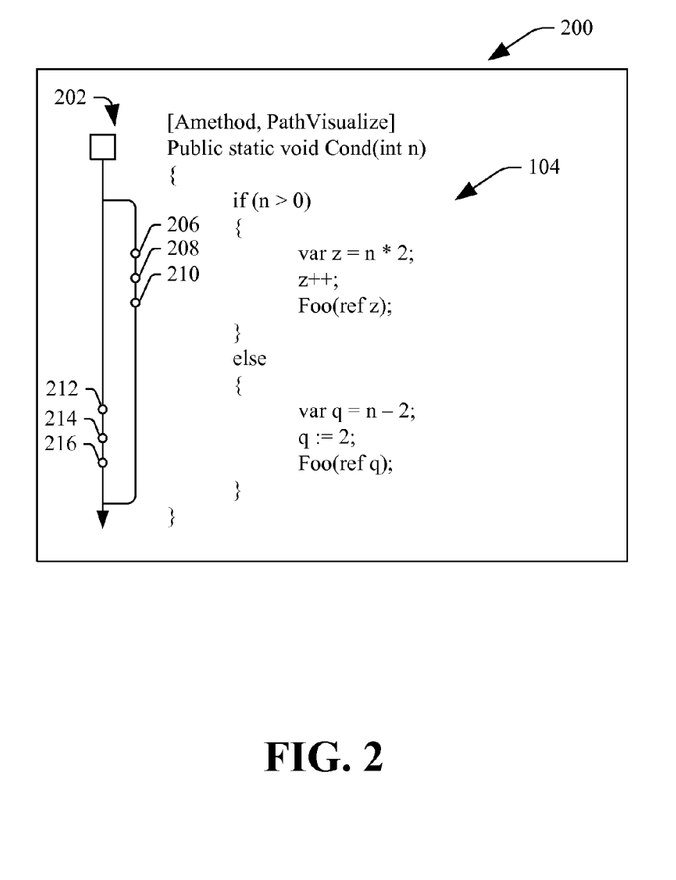
FIG. 2 is an exemplary graphical user interface that comprises source code and a control flow diagram.

Referring now to FIG. 2, an exemplary graphical user interface 200 that can be generated by the path visualizer component 112 is illustrated. The graphical user interface 200 comprises the source code 104, which can include numerous statements and branches. The graphical user interface 200 further comprises a control flow diagram 202 that is shown together with the source code 104, wherein the control flow diagram 202 graphically depicts different theoretical execution paths that can be taken during execution of the source code 104. For instance, it can be ascertained that the source code 104 comprises an if statement. Accordingly, a branch exists in the source code at such if statement. The control flow diagram 202 depicts this branch in the source code 104 with a corresponding branch in the control flow diagram 202.

The control flow diagram 202 further comprises a plurality of graphical indicia 206-216. Each of these graphical indicia 206-216 corresponds to a different statement in the source code 104. For instance, the graphical indicia 206 corresponds to a statement that defines a value for the variable z. Graphical indicia 208 corresponds to a statement in the source code 104 that again defines a value for the variable z. The graphical indicia 210 corresponds to a call to the method Foo. The graphical indicia 212 corresponds to an assignment of a value to the variable q in the source code 104. The graphical indicia 214 again corresponds to the assignment of a value to the variable q, and the graphical indicia 216 corresponds to a function call that passes the value of q to the function Foo.

It can thus be ascertained that the control flow diagram 202 is shown as a continuous line that can include branches that represent different possible branches in the source code 104 based at least in part upon structure of the source code 104. One of ordinary skill in the art, however, will recognize that in some instances, even though the structure of the source code 104 theoretically supports execution of a particular branch of such source code 104, in some cases (due to assignment of particular variables in other portions of the source code 104), the source code 104 may execute in unforeseen manners (e.g., a certain branch may never be taken in the source code 104). Oftentimes a developer would like to ascertain such issues prior to deployment of a program.

As described above, in a first example the user can ask the code analyzer component 110 to perform symbolic execution over the source code 104, such that the code analyzer component 110 outputs a variety of possible execution traces of the source code 104 without having any input other than a starting point and an end point being provided by the user. In other cases, however, the user may wish to constrain the symbolic execution undertaken by the code analyzer component 110, such that execution traces output by the code analyzer component 110 are over a specified statement. To specify a particular statement, the user can select graphical indicia in the control flow diagram 202. For instance, if the user wishes to review execution traces that pass through the statement var q=n−2, then the user can select the graphical indicia 212 that corresponds to such statement. This can constrain symbolic execution undertaken by the code analyzer component 110 such that only execution traces that pass through the statement corresponding to the graphical indicia 212 are output and provided to the path visualizer component 112.

Figure 3:
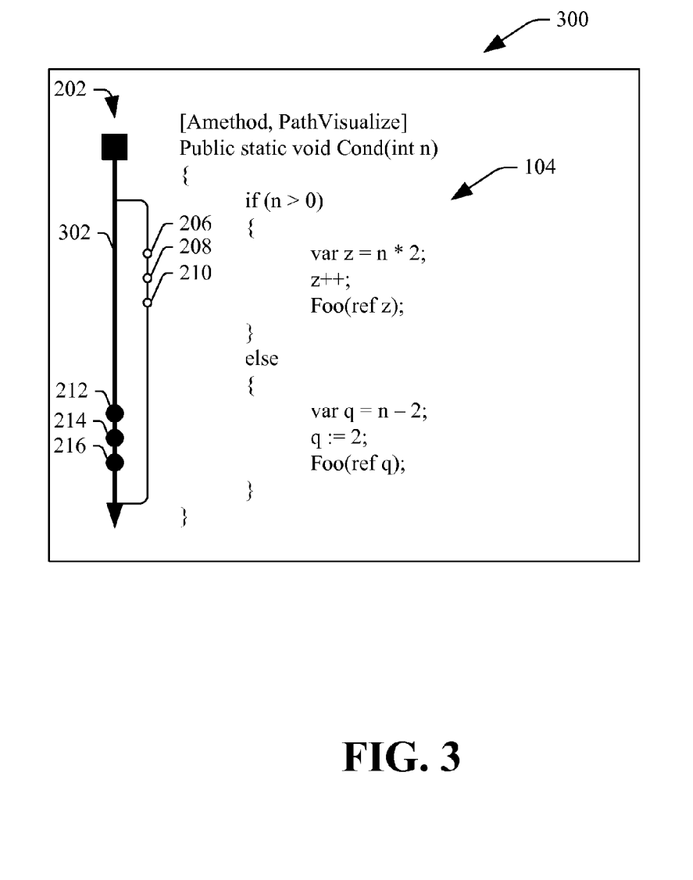
FIG. 3 is an exemplary graphical user interface that depicts source code together with a control flow diagram and a visualized execution trace.

Referring now to FIG. 3, another exemplary graphical user interface 300 is depicted. This graphical user interface 300 includes the source code 104, the control flow diagram 202, and an execution trace 302 output by the code analyzer component 110. The execution trace 302 is shown as being overlaid on the control flow diagram 202. In an alternative embodiment, the execution trace 302 can be shown beside the control flow diagram 202. Furthermore, the control flow diagram 202 can be shown in a different color than the execution trace 302 or in a different format (e.g., dashed line versus solid line). In this exemplary graphical user interface 300, the execution trace 302 passes through the statements corresponding to the graphical indicia 212, 214 and 216 does not pass through the statements corresponding to the graphical indicia 206-210. If the user wishes to obtain additional information pertaining to the statements corresponding to the graphical indicia 212-216, the user can select one of these graphical indicia 212-216. This may cause a popup window or other graphical user interface to be presented to the user that provides the user with additional information about the statement that corresponds to the selected graphical indicia. Such information may include the value of one or more variables in the statement, etc.

In the exemplary graphical user interfaces 200 and 300 shown in FIGS. 2 and 3, the user may, for instance use, a scroll bar to scroll through different portions of the source code 104 view how execution paths can "jump" to different portions of the source code 104. For instance, the graphical user interfaces 200 and 300 may not include sufficient space on a display screen to depict theoretical execution of a particular portion of source code selected by the user. If, for instance, a theoretical execution path in the source code 104 jumps to a method that is not located directly beneath the source code 104 in the graphical user interfaces 200 and 300, a selectable link can be provided that automatically causes an updated graphical user interface to be presented to the user responsive to the being selected by the user, wherein the updated graphical user interface presents a continuation of a theoretical execution path.

Figure 4:
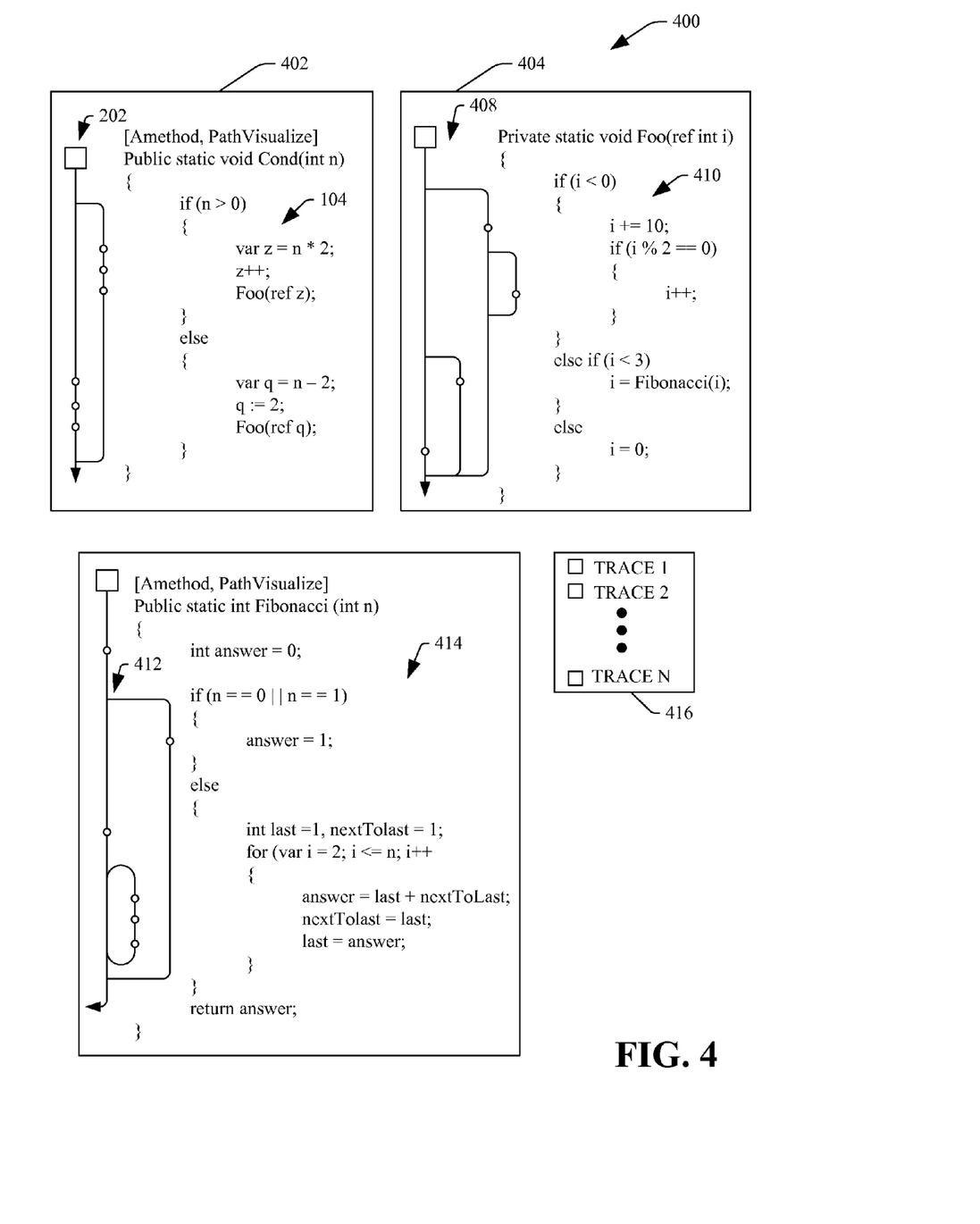
FIG. 4 is an exemplary graphical user interface that depicts a control flow diagram shown in combination with source code.

With reference now to FIG. 4, another exemplary graphical user interface 400 that can be presented to the user is illustrated. In an example, the user may select a particular method in the source code 104 for analysis. This method may be interrelated to several other methods that are located at different positions in the source code 104. The graphical user interface 400 can comprise a plurality of different windows 402-406, wherein each of the windows 402-406 includes source code that is in some way interrelated to a portion that is of interest to the user. In the example depicted in this figure, the user may wish to ascertain execution behavior of the method Cond. This method may call the function Foo, which can be shown in the window 404. The function Foo shown in the window 404 may call the function Fibonacci. Thus, subsequent to the user selecting the method Cond in the source code 104, the windows 402-406 can be presented to the user, wherein such windows 402-406 illustrate interconnected portions of the source code 104.

Each of the windows 402-406 of the graphical user interface 400 comprises source code and a corresponding control flow diagram. Specifically, the window 402 comprises the control flow diagram 202 corresponding to the source code 104. The window 402 comprises a control flow diagram 408 corresponding to source code 410, and the window 406 comprises a control flow diagram 412 that corresponds to source code 414. The control flow diagram 202 has been described above. The control flow diagram 408 includes three different branches that correspond to branches in the source code 410, and the control flow diagram 412 includes two different branches that correspond to the source code 414. Thus, even for the relatively simple portion of source code shown, a relatively large number of possible execution paths can be taken when the source code shown in the windows 402-406 is executed.

The graphical user interface 400 further comprises a window 416 that depicts a list of execution traces output by the code analyzer component 110 (with or without constraints presented by the user). At this point, the user has not selected any of the execution traces shown in the window 416, and thus the windows 402-406 include source code 104, 410 and 414 and corresponding control flow diagrams 202, 408 and 412. Upon the user selecting one or more of the execution traces listed in the window 416, the selected execution traces can be visually depicted in the graphical user interface 400 by the path visualizer component 112 together with the control flow diagrams 202, 408, and 412 and the source code 104, 410, and 414, respectively.

Figure 5:
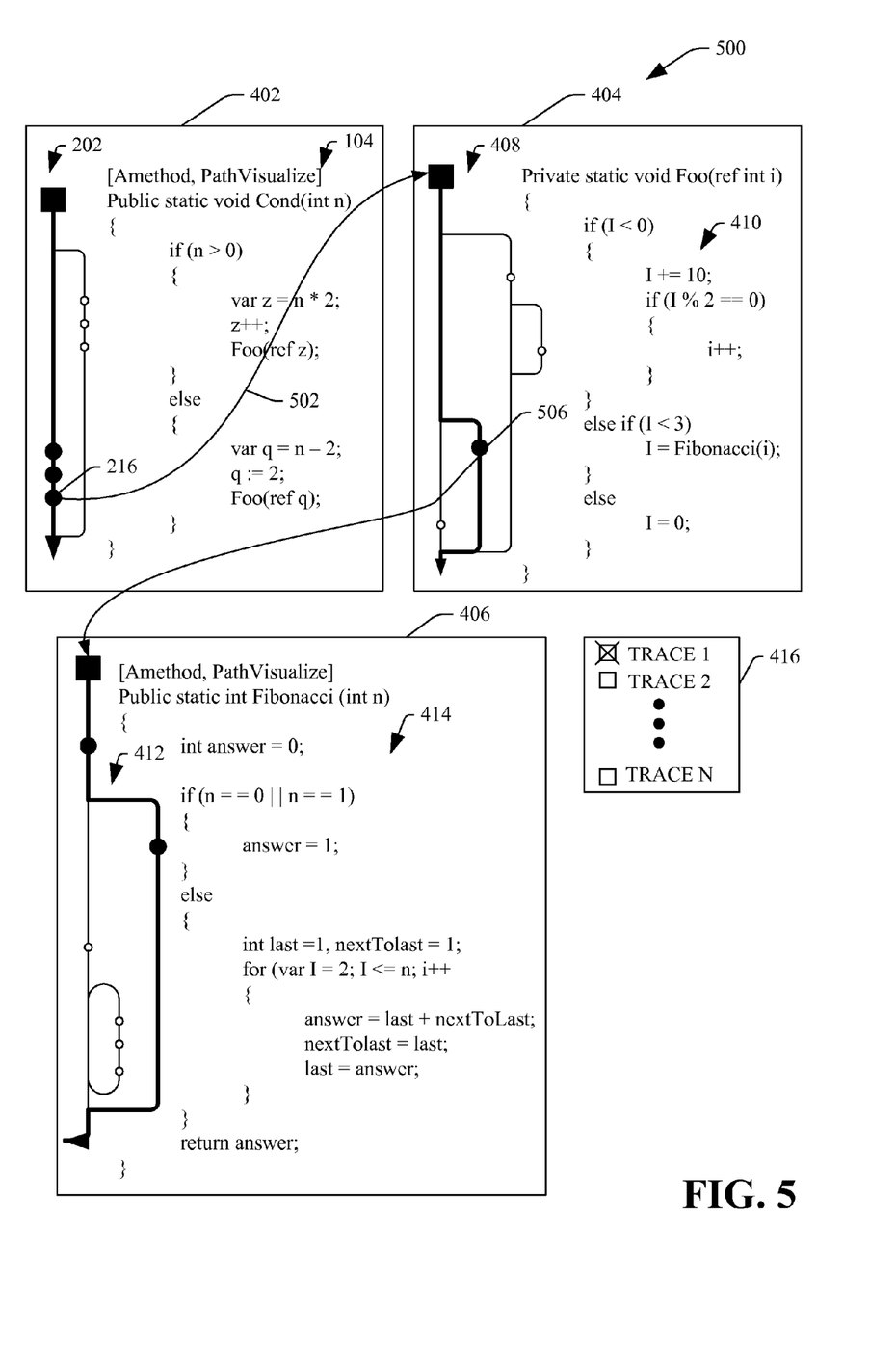
FIG. 5 is an exemplary graphical user interface that depicts source code and corresponding control flow diagram and an execution trace together on a graphical user interface to developer.

With reference now to FIG. 5, another exemplary graphical user interface 500 is illustrated. As shown, the user has selected a first execution trace from the window 416. This causes such execution trace to be visualized in the windows 402-406 together with the control flow diagrams 202, 408 and 412 and the source code 104, 410 and 414 respectively. In the example depicted in FIG. 5, the execution trace selected in the window 416 is overlaid upon the control flow diagrams 202, 408 and 412. Additionally, the graphical user interface 500 comprises arrows 502 and 504 that illustrate to the user the location of method calls and how the source code is executed during the selected execution trace. Specifically, the arrow 502 indicates that the method shown in the window 404 is called at the statement corresponding to the graphical indicia 216. Similarly the arrow 504 illustrates that the method shown in the window 406 is called at the statement corresponding to graphical indicia 506 shown in the window 404.

Figure 6:
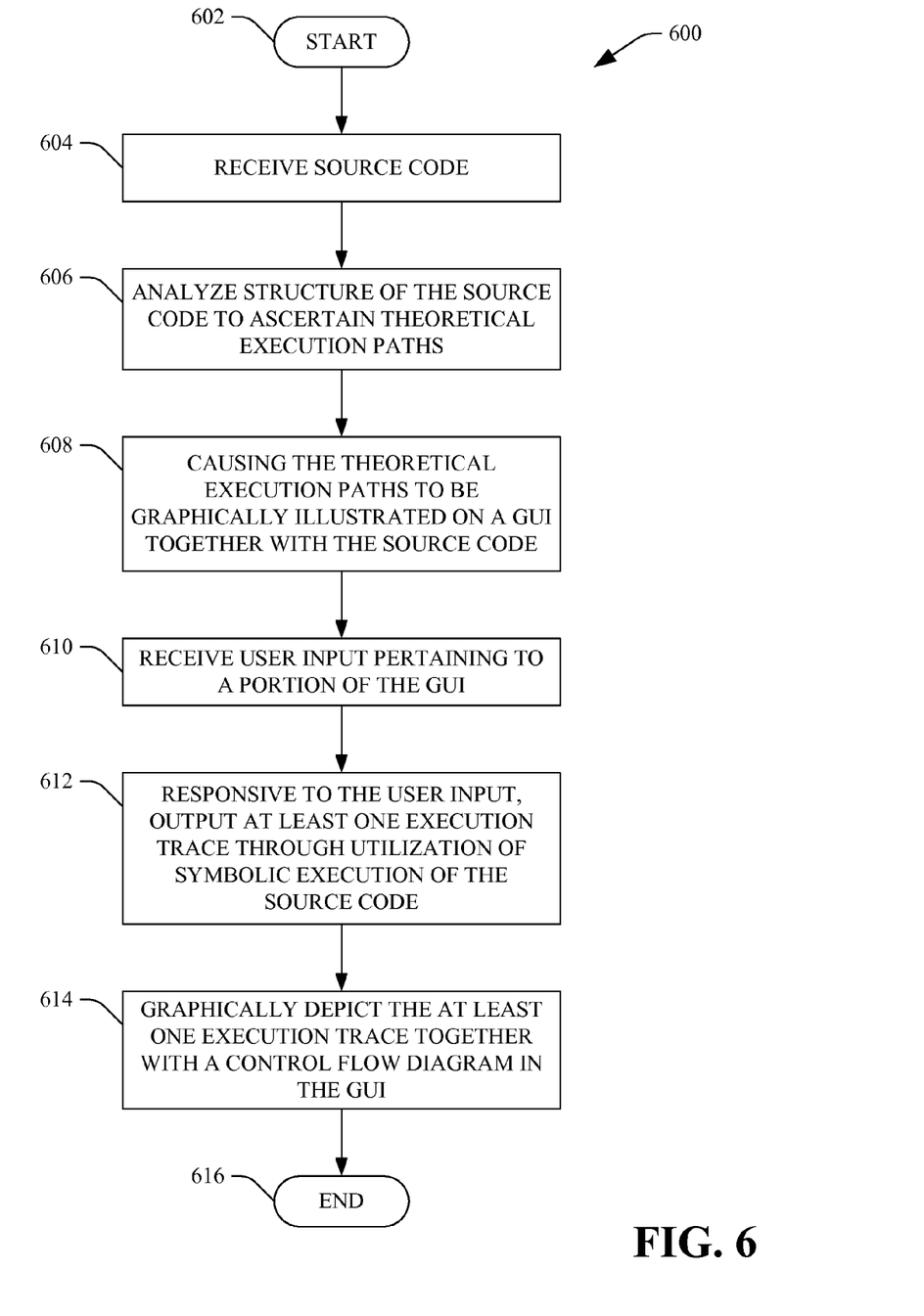
FIG. 6 is a flow diagram that illustrates an exemplary methodology for graphically depicting an execution trace together with a control flow diagram and corresponding source code in a graphical user interface.
Figure 7:
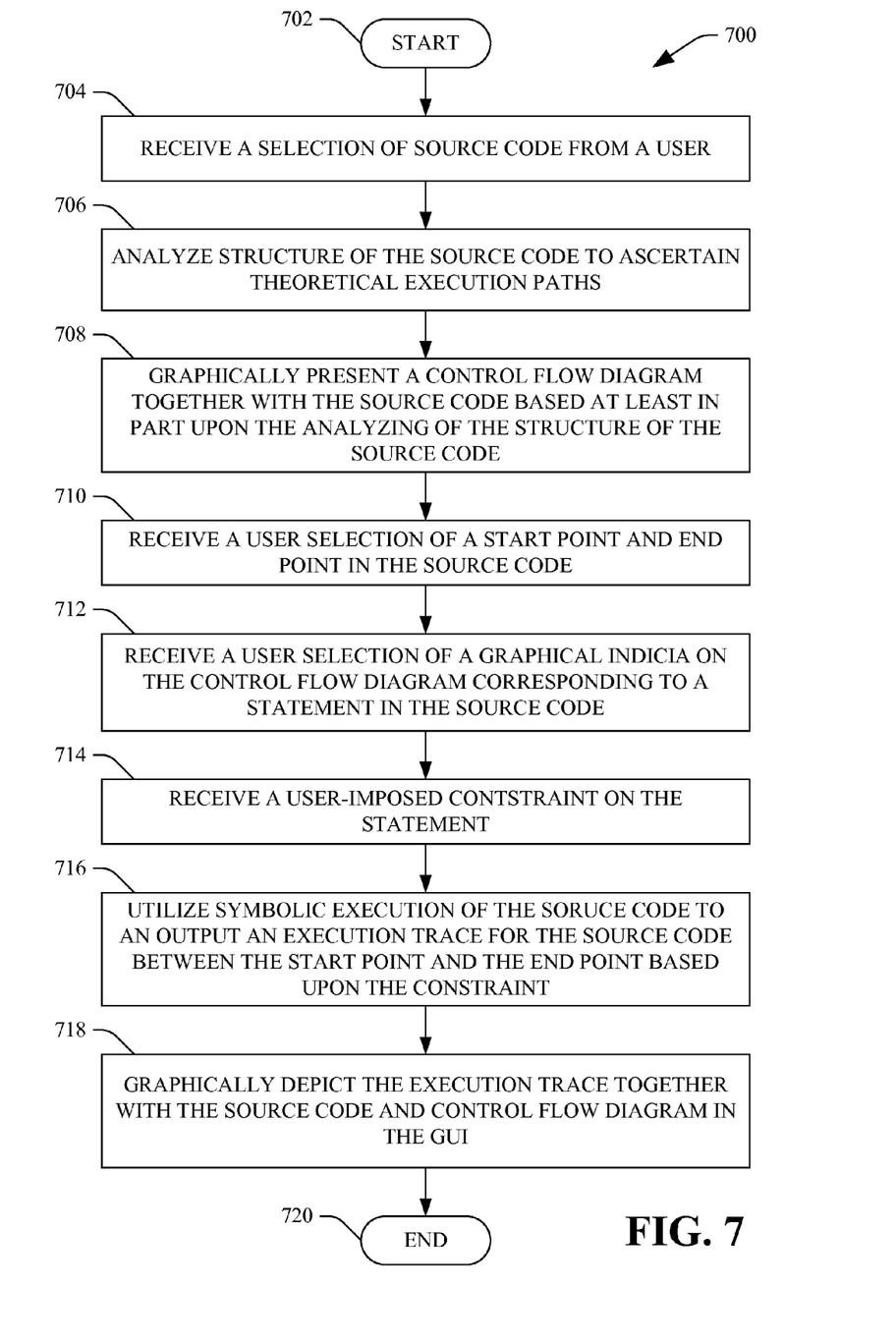
FIG. 7 is a flow diagram that illustrates an exemplary methodology for graphically depicting an execution trace together with a control flow diagram and corresponding source code.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 6, an exemplary methodology 600 that facilitates graphically depicting an execution trace together with a visual depiction of possible execution flows of source code (e.g., a control flow diagram) is illustrated. The methodology 600 begins at 602, and at 604 source code is received. As described above, the source code can comprise a plurality of statements that define values of variables and can further comprise a plurality of branches. Branches in the source code can be taken during execution of the source code based at least in part upon one or more values assigned to one or more variables in the source code.

At 606, the structure of the source code is analyzed to ascertain theoretical execution paths in the source code. These execution paths can correspond to conditionals, loops, jumps, exception flows, exception handling, etc.

At 608, the theoretical execution paths are caused to be graphically illustrated on a graphical user interface. For instance, the theoretical execution paths can be graphically illustrated as a control flow diagram together with the source code. As shown in the graphical user interfaces above, the control flow diagram illustrates possible branches in the source code taken during execution of the source code and is shown in correlation with the source code. Thus, for instance, a branch visually depicted in the source code may be shown in correspondence with a positional statement, a loop, a jump, etc. Other mechanisms for visualizing theoretical execution paths are also contemplated and intended to fall under the scope of the hereto-appended claims.

At 610, user input is received pertaining to a portion of the graphical user interface. For instance, the user input can be a selection of a start point, a selection of a particular method, a selection of a particular statement on the control flow diagram, etc. At 612, responsive to user input, at least one execution trace is output, wherein the execution trace is determined based at least in part upon symbolic execution of the source code.

At 614, the at least one execution trace is graphically depicted together with the graphical visualization of theoretical execution paths of the source code (e.g., the control flow diagram) and the source code in the graphical user interface. For instance, the execution trace can be shown as an overlay of the control flow diagram and/or can be shown in a different color than the control flow diagram in the graphical user interface. The methodology 600 completes at 616.

Referring now to FIG. 7, an exemplary methodology 700 that facilitates graphically depicting an execution trace pertaining to source code together with the source code in a control flow diagram in a graphical user interface is illustrated. The methodology 700 starts at 702, and at 704 a selection of source code is received from the user. For instance, the user may utilize a pull down menu in a graphical user interface of an application that facilitates developer review of source code to select such source code. As described above, the source code may include multiple branches and statements that correspond to defining variable values.

At 706, the structure of the source code is analyzed to ascertain theoretical execution paths through the source code. At 708, based at least in part upon the analyzing of the structure of the source code, a control flow diagram is graphically depicted together with the source code on a graphical user interface. The control flow diagram is presented in correlation with the source code to depict theoretical execution paths through the source code. Additionally, the control flow diagram may be a continuous line that illustrates branches, and graphical indicia can be shown on the control flow diagram to represent a plurality of statements in the source code. These graphical indicia can be shown in graphical correlation to statements in the source code.

At 710, the user selection of a start point and an end point in the source code is received. This start point and end point can indicate a portion of source code to the user which is used to test and/or review.

At 712, a selection from the user of a graphical indicia from amongst a plurality of graphical indicia is received from the user. The graphical indicia selected by the user as mentioned above corresponds to a statement in the source code. At 714, a user imposed constraint on the aforementioned statement is received. This constraint can require that execution of the source code pass through the selected statement, that a variable corresponding to the selected statement has a particular value or range of values, etc.

At 716, symbolic execution of the source code is utilized to output an execution trace for the source code between the desired start point and the desired end point. Furthermore, the execution trace is based at least in part upon the constraint received at 714.

At 718, the execution trace is graphically depicted together with the source code and the control flow diagram in the graphical user interface. The methodology 700 completes at 720.

Figure 8:
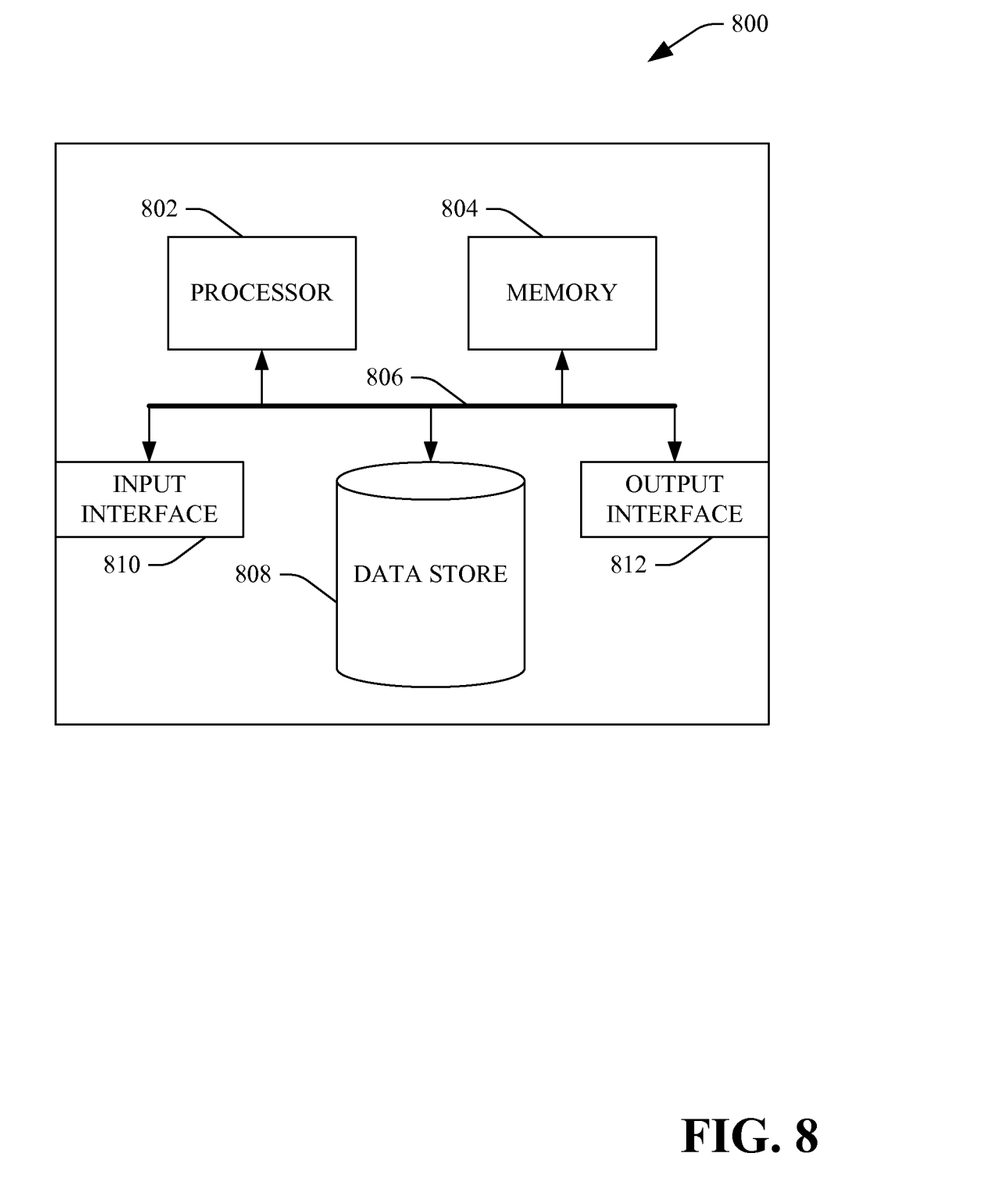
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports visualization of a control flow diagram in a graphical user interface. In another example, at least a portion of the computing device 800 may be used in a system that supports visualizing an execution trace in a graphical user interface. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store execution traces, control flow diagrams, structural analysis of source code, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, structural analysis of source code, execution traces, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
    receiving source code, wherein the source code comprises a plurality of statements that define values of variables, wherein the source code further comprises a plurality of branches, wherein branches are taken during execution of the source code based at least in part upon a value of at least one variable in the variables;
    analyzing structure of the source code to ascertain theoretical execution behavior of the source code;
    causing the theoretical execution behavior of the source code to be graphically illustrated on a graphical user interface as a visualization;
    receiving a selection from a user on the graphical user interface of a particular portion of the graphical user interface;
    responsive to receiving the selection, outputting at least one execution trace based at least in part upon dynamic symbolic execution of the source code; and
    graphically depicting the at least one execution trace together with the visualization in the graphical user interface.

2. The method of claim 1, wherein the visualization is a control flow diagram that is displayed together with the source code, and wherein the at least one execution trace is overlaid on the control flow diagram in the graphical user interface, wherein the at least one execution trace is depicted in a first color and wherein the control flow diagram is depicted in a second color.

3. The method of claim 2, further comprising:
    responsive to receiving the selection, outputting a plurality of different execution traces based at least in part upon the dynamic symbolic execution of the source code; and
    graphically depicting a list of the plurality of different execution traces in the graphical user interface.

4. The method of claim 3, wherein the at least one execution trace is graphically depicted together with the control flow diagram in the graphical user interface subsequent to receiving a selection from the user of the at least one execution trace in the list.

5. The method of claim 1, wherein the visualization is a control flow diagram that is displayed together with the source code, and wherein the control flow diagram is a continuous line with at least one graphical indicia thereon, wherein the graphical indicia corresponds to a statement in the source code that defines a value for a variable.

6. The method of claim 5, further comprising:
    receiving a selection of the graphical indicia from the user; and
    responsive to receiving the selection of the graphical indicia from the user, utilizing dynamic symbolic execution to output at least one execution trace that passes through the statement in the source code.

7. The method of claim 1, wherein the visualization is a control flow diagram that is displayed together with the source code, wherein the source code comprises a plurality of different methods, and wherein the method further comprises:
    simultaneously displaying the plurality of different methods in a respective plurality of different windows on the graphical user interface, wherein the control flow diagram spans the plurality of different windows.

8. The method of claim 7, further comprising:
    causing a graphical indicia to be displayed on the control flow diagram, wherein the graphical indicia is displayed to correspond to a method call in the source code shown in a first window; and
    causing a graphical arrow to traverse from the first window to a second window, wherein the second window comprises source code for a method called by the method call shown in the first window.

9. The method of claim 1, wherein the visualization is a control flow diagram that is displayed together with the source code, and wherein the method further comprises:
    receiving a selection from the user of a start point on the control flow diagram and an end point on the control flow diagram, wherein dynamic symbolic execution is restricted to source code between the start point and the end point such that the execution trace is restricted between the start point and the end point.

10. The method of claim 1, further comprising:
    graphically depicting a plurality of execution traces located through utilization of dynamic symbolic execution of the source code together with the visualization in the graphical user interface.

11. The method of claim 1, further comprising:
    receiving an indication from the user that at least one variable in the source code is constrained to a particular value or range of values; and
    responsive to receiving the indication, utilizing symbolic execution of the source code to output the at least one execution trace such that the at least one execution trace passes through a statement corresponding to the at least one variable, wherein the at least one variable has been assigned the particular value or range of values.

12. A system comprising a plurality of components that are executable by a processor, the components comprising:
- a code analyzer component that receives source code, wherein the source code comprises a plurality of statements that define values for variables, and wherein the source code comprises a plurality of branches, wherein the branches in the source code are taken during execution of the source code based at least in part upon at least one value assigned to at least one variable, wherein the code analyzer component analyzes structure of the source code to ascertain theoretical execution behavior of the source code;
- a path visualizer component that generates a graphical user interface for presentment to a user, wherein the graphical user interface comprises the source code and a control flow diagram that is shown in correlation with the source code, wherein the control flow diagram is representative of the theoretical execution behavior of the source code; and
- a receiver component that is in communication with the code analyzer component and the path visualizer component, wherein the receiver component receives user input with respect to at least a portion of the control flow diagram, wherein responsive to the receiver component receiving the input the code analyzer component utilizes symbolic execution over the source code to output an execution trace over at least a portion of the source code that corresponds to the user input, and wherein the path visualizer component receives the execution trace and visualizes the execution trace on the graphical user interface together with the control flow diagram.

13. The system of claim 12, wherein the path visualizer component causes the execution trace to be visually overlaid atop the control flow diagram.

14. The system of claim 12, wherein the code analyzer component utilizes symbolic execution over the source code to output a plurality of execution traces over the at least the portion of the source code that corresponds to the user input, wherein the path visualizer component causes a listing of the plurality of execution traces to be displayed together with the control flow diagram.

15. The system of claim 14, wherein the receiver component receives a selection of each of the plurality of execution traces in the listing of the plurality of execution traces, and wherein the path visualizer component visualizes the plurality of execution traces on the graphical user interface together with the control flow diagram.

16. The system of claim 12, wherein the path visualizer component causes a plurality of graphical indicia to be depicted on the control flow diagram, wherein the plurality of graphical indicia are displayed in respective correlation with the plurality of statements in the source code.

17. The system of claim 16, wherein the receiver component receives a selection of one of the plurality of graphical indicia on the control flow diagram from the user, and wherein the receiver component receives a constraint with respect to the statement that corresponds to the graphical indicia on the control flow diagram, and wherein the code analyzer outputs the execution trace based at least in part upon the constraint.

18. The system of claim 17, wherein the constraint is at least one of a requirement that the execution trace passes through the statement that corresponds to the graphical indicia or a value of range of values for a variable defined in the statement.

19. The system of claim 12, wherein the code analyzer component outputs the execution trace based at least in part upon a user-defined constraint.

20. A computing device comprising a computer-readable medium, the computer-readable medium comprising instructions that, when executed by a processor, cause the processor to perform acts comprising:
- receiving a selection of source code from a user, wherein the source code comprises a plurality of branch points and a plurality of statements, wherein the plurality of statements define values for variables utilized in the source code, and wherein execution paths are taken from the branch points based at least in part upon one or more values respectively assigned to one or more of the variables;
- analyzing structure of the source code to ascertain theoretical execution paths through the source code;
- based at least in part upon the analyzing of the structure of the source code, graphically presenting a control flow diagram together with the source code on a graphical user interface, wherein the control flow diagram is presented in correlation with the source code to depict the theoretical execution paths through the source code, and wherein the control flow diagram comprises a plurality of graphical indicia that graphically correspond to the plurality of statements in the source code;
- receiving a selection from the user of a desired start point and a desired end point of the source code;
- receiving a selection from the user of a graphical indicia from amongst the plurality of graphical indicia, wherein the graphical indicia selected by the user corresponds to a statement in the plurality of statements in the source code;
- receiving a constraint to be placed on the statement from the user;
- utilizing symbolic execution of the source code to output an execution trace for the source code between the desired start point and the end point, wherein the execution trace is based at least in part upon the constraint; and
- graphically depicting the execution trace together with the control flow diagram on the graphical user interface subsequent to the execution trace being output.

* * * * *